Patented Apr. 30, 1935

1,999,716

UNITED STATES PATENT OFFICE 1,999,716

SYNTHETIC RESIN

Horace P. Billings, Merchantville, and Dee A. Hurst, Haddonfield, N. J., assignors to Radio Corporation of America, a corporation of Delaware No Drawing. Application June 30, 1932, Serial No. 620,283

4 Claims. (Cl. 260—4)

This invention relates to synthetic resins and, more particularly, to a method of controlling the properties of the resins to render them fit for use in making materials such as phonograph records.

Laminated phonograph records of the thin, flexible type have recently come into fairly extensive use. Records of this type comprise a suitable base, generally of cardboard or paper, covered by one or more layers of a thermoplastic material which, under the action of heat and pressure becomes hard and infusible, and is thus rendered fit for the retention of sound grooves impressed therein.

One class of materials employed for surface coatings for phonograph records comprises synthetic resins prepared from the chemical reaction of condensation between a phenol and an aldehyde. The phenols may be phenol, resorcinol, cresols or xylenols, while the aldehyde is usually formaldehyde, acetaldehyde or furfural, and the resins may be made of a single phenolic substance with a single aldehyde or any combination thereof. The condensation product, in the form of a varnish, may be employed for coating a suitable base material, and when the coated product is dried and subjected to the pressure of a heated record matrix, the resin becomes hard and set, with the sound grooves impressed therein.

Among the requirements for records of this type are (1) that the rate of curing, that is, the time required for converting the dried, coated resin into a hard, infusible mass, must be fairly rapid, and (2) that the laminated product shall be uniform. The former is essential to economical quantity production, while the latter is necessary if the finished records are to be satisfactory for use.

Resorcinol-formaldehyde resins have been proposed for phonograph record manufacture since the curing rate thereof is relatively rapid. However, resins wherein resorcinol constitutes the phenolic body have been found to be unstable in the "A" stage, and therefore difficult to work with. Furthermore, such resins are hard and brittle, in the absence of suitable plasticizers being added thereto, and therefore unsatisfactory for phonograph record use. To overcome the aforementioned difficulties and render the resins plastic, it has been proposed to incorporate glycerine in the resin, but the addition of glycerine fails to entirely remove the characteristic of brittleness and, in addition, hinders production of a uniform product.

In accordance with our invention, we control the characteristics of a resin by incorporating several phenolic bodies therein and by adjusting the proportion of resorcinol to the other phenolic bodies present. The addition of any of the phenols other than resorcinol to the resin, while imparting thereto the desirable properties of resins formed of each of the individual phenolic bodies, controls the rate at which the reaction takes place, since they enter into the reaction also, as well as the rate of curing or polymerization. This may be counteracted, further according to our invention, by adding to the resin a catalyst which is either slightly basic or slightly acidic in nature. This not only speeds up the condensation reaction, but increases the curing rate as well, and at the same time acts also as a plasticizer. In this way, we are able to control the curing rate of the resin as well as control the properties thereof to obtain a uniform product, and we thus attain the primary object of our invention, namely, to provide a method of controlling the characteristics of synthetic resins which is not subject to the defects presents in the prior art.

Another object of our invention is to provide an improved method of forming synthetic resins particularly fit for use in the manufacture of phonograph records.

Still another object of our invention is to provide an improved synthetic resin especially fit for the manufacture of laminated articles, such as phonograph records, and which will yield a uniform product.

A further object of our invention is to provide an improved method of forming a synthetic resin which is economical and efficient in use, and which readily lends itself to rapid quantity production of laminated articles, such as phonograph records, for which it is particularly well adapted.

The above and other ancillary objects and advantages of our invention will become more apparent from the following detailed description:

In preparing the resins in accordance with our invention, we preferably employ certain proportions of resorcinol to the other phenolic bodies, although these proportions can be varied to any desired extent depending upon the results sought. For example, when the phenolic body consists of 8 parts of resorcinol and two parts of cresol, a resin is formed very readily which has a speed of cure nearly equal to that of resorcinol alone. If, on the other hand, 6 parts of cresol are used to 4 parts of resorcinol, the speed of reaction is slow and the speed of cure is reduced. We have found that best results may be obtained when the ratio of resorcinol used to cresol or other phenolic body used is between 4:1 and 4:6.

A sample formula would include 120 grams of resorcinol, 30 grams of cresol and 140 grams of formaldehyde. Such materials as fillers, oils and colors may be incorporated either before or after the reaction. Preferably, although not necessarily, we employ also a catalyst, either slightly basic or slightly acidic in nature, to help control the speed of the reaction. A catalyst which we have found particularly valuable in this connection is para-nitraniline, since it has approximately the correct basicity. The para-nitraniline may be first dissolved in cresol, and the resulting solution added to the formaldehyde solution. The amount of cresol employed will be governed by the properties which it is sought to impart to the finished resin, while the amount of para-nitraniline employed will determine the speed of the reaction and the subsequent curing rate. We have found that while it is difficult to incorporate the para-nitraniline directly into the resin, it may be very readily and efficiently incorporated therein by first dissolving it in the cresol.

Preferably, we cause all the materials to react together in a suitable kettle fitted with means for efficiently stirring the mass. The reaction should be carried out at a temperature below 96° C. at 760 mms. pressure. When the resin reaches a syrup-like consistency, it can either be poured out and rapidly cooled, or water and an alcohol may be added. The finished resin may then be coated onto a suitable base material, such as paper, parchment, cardboard, fibre board, or the like and allowed to dry. After the resin has dried on the base material, the records may be pressed therefrom.

If desired, the resin may also be mixed with relatively large proportions of filler, such as flock or wood flour, and dried. Thereafter, the resin may be moulded into various shapes.

Although we have described a certain specific embodiment of our invention, we are fully aware that many modifications thereof are possible. For example, instead of employing cresol as the phenolic body other than resorcinol, we may employ phenol, xylenol, or any combinations thereof. Furthermore, while we have specified para-nitraniline as the catalyst, it should be apparent that any other suitable catalyst, including one that is slightly acidic rather than slightly basic, may be employed. Our invention, therefore, is not to be restricted except insofar as is necessitated by the prior art and by the spirit of the appended claims.

We claim as our invention:

1. The method of controlling the characteristics of a resorcinol-formaldehyde resin which comprises adding to the unreacted resorcinol-formaldehyde another phenol and para-nitraniline dissolved in said other phenol, and reacting all of said materials in the presence of the para-nitraniline.

2. The method of controlling the characteristics of a resorcinol-formaldehyde resin which comprises adding to the unreacted resorcinol-formaldehyde a cresol and para-nitraniline dissolved in said cresol, and reacting all of said materials in the presence of the para-nitraniline.

3. A synthetic resin resulting from the reaction of condensation between resorcinol, a cresol and formaldehyde in the presence of para-nitraniline.

4. A synthetic resin resulting from the reaction of condensation between resorcinol, a cresol and formaldehyde in the presence of para-nitraniline and wherein the ratio of resorcinol to the cresol is not more than 4 to 1 nor less than 4 to 6 by weight.

HORACE P. BILLINGS.
DEE A. HURST.